United States Patent [19]

Hubben et al.

[11] Patent Number: 5,073,681
[45] Date of Patent: Dec. 17, 1991

[54] TWO-PIECE WALL PLATE FOR ELECTRICAL DEVICE

[75] Inventors: Edward B. Hubben, Skaneateles; Jean-Claude Marcou, Fayetteville, both of N.Y.

[73] Assignee: Pass & Seymour, Inc., Syracuse, N.Y.

[21] Appl. No.: 568,511

[22] Filed: Aug. 16, 1990

[51] Int. Cl.[5] .............................................. H02G 3/14
[52] U.S. Cl. .................................................. 174/66
[58] Field of Search ........................... 174/66; 220/241

[56] References Cited

U.S. PATENT DOCUMENTS

| | | | |
|---|---|---|---|
| 3,011,008 | 11/1961 | Slater | 174/66 |
| 3,197,549 | 7/1965 | Good | 174/66 |
| 4,833,277 | 5/1989 | Jacoby et al. | 174/66 |
| 4,835,343 | 5/1989 | Graef et al. | 220/241 X |

*Primary Examiner*—Harold Broome
*Assistant Examiner*—David A. Tone
*Attorney, Agent, or Firm*—Charles S. McGuire

[57] ABSTRACT

A two-piece wall plate for use with a wall mounted receptacle, switch or other wiring device. A first, frame-like base plate is secured by screws to the mounting ears of the wiring device, and a second, frame-like cover plate is releasably connected to the base plate, in covering relation thereto. A bezel portion of the base plate closely surrounds the periphery of one or more wiring devices mounted in the usual way in a conventional wall box, and extends through a central opening in the cover plate. The cover plate is mounted on the base plate by a snap fit connection provided by elongated grooves in the outwardly facing side surface of the bezel which receive elongated ridges extending inwardly about the boundary of the central opening in the cover plate.

11 Claims, 5 Drawing Sheets

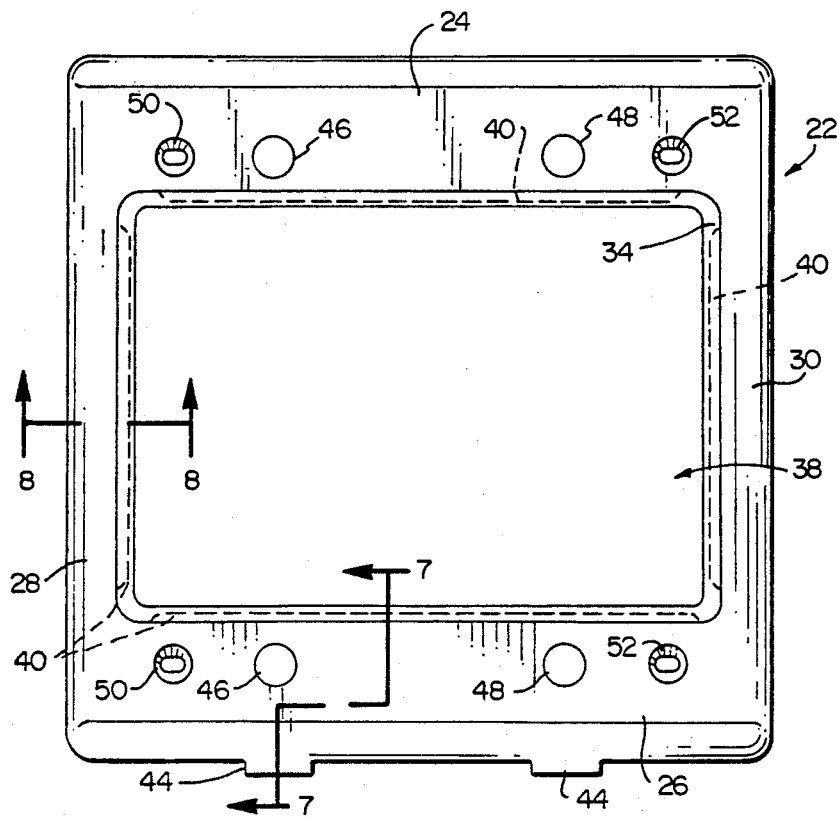
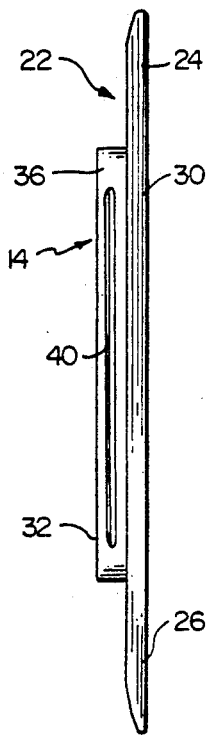
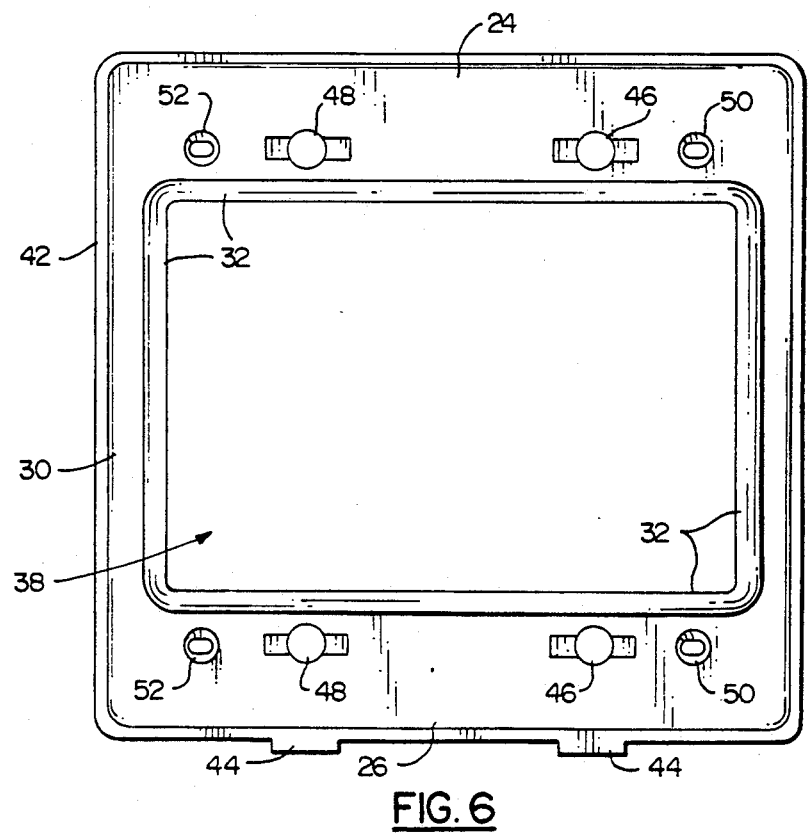

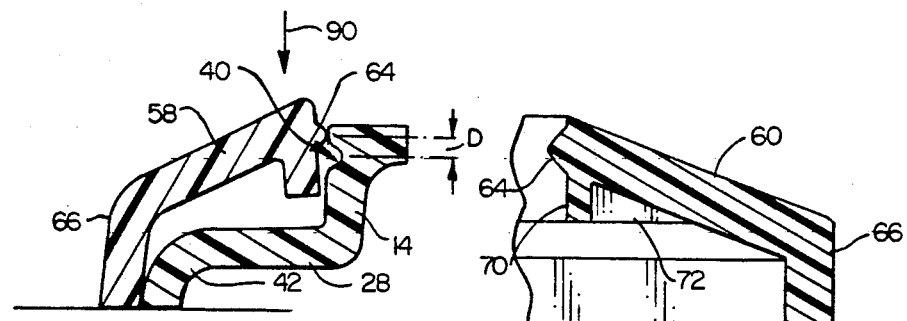
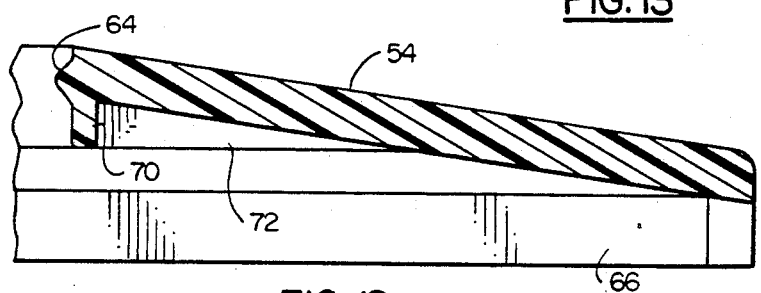
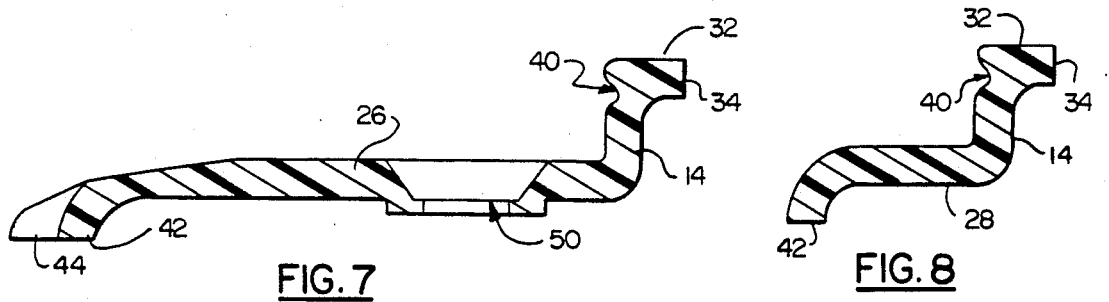
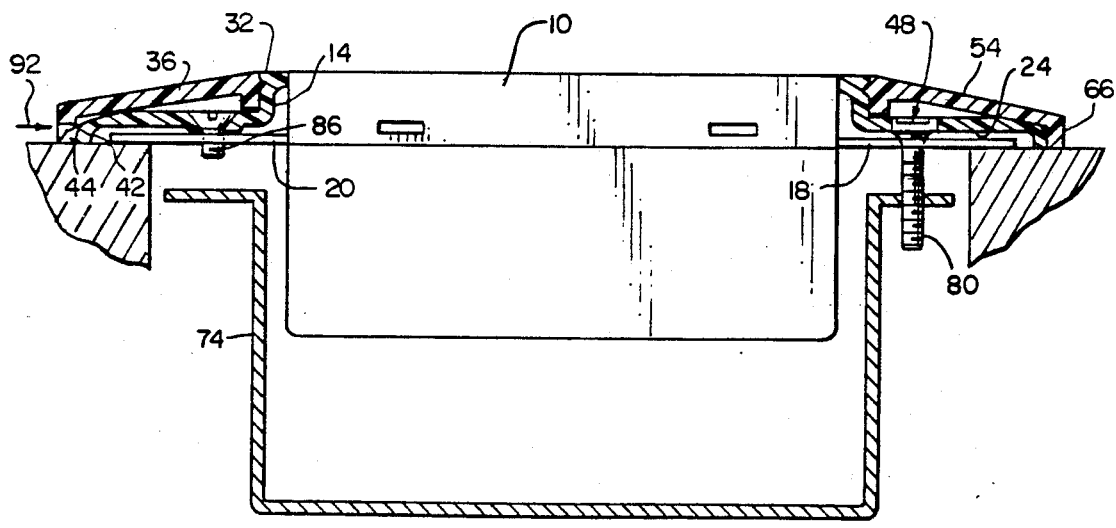

TWO-PIECE WALL PLATE FOR ELECTRICAL DEVICE

BACKGROUND OF THE INVENTION

The present invention relates to wall plates of the type used to provide support, enclosure and decorative functions for wall-mounted wiring devices, such as switches and receptacles. More specifically, the invention relates to a two-piece wall plate having no exposed fastening devices, and providing improved features of both mechanical design and esthetic appearance.

Wall-mounted wiring devices such as switches and receptacles of various types are commonly constructed with a yoke or mounting strap having portions extending outwardly from opposite sides of the device. The device is mounted in a standard wall box by means of screws passing through openings in the extending portions of the yoke and received in threaded openings in the wall box. Such mounting may also ensure proper grounding of the device. The wall box is supported behind an opening in the wall such that the surface of the wiring device which is visible in its operative position is more or less flush with the wall surface. The installation is normally completed by mounting a wall plate upon the wiring device with operative portions of the device positioned within an opening in the plate, which covers the opening in the wall and the front of the wall box.

The wall plate is in most cases a relatively thin, rectangular, frame TM like member of plastic or metal. The most common means of mounting the wall plate is one or more screws passing through the plate and received in threaded openings in the body or yoke of the wiring device, with the screw heads visible on the exterior of the plate. A number of wall plate or other electrical cover plate designs have been proposed, however, wherein the fastening means are entirely enclosed and have no visible portions. These include, for example, the arrangements disclosed in U.S. Pat. No. 2,934,590 of Thomas et al, U.S. Pat. No. 3,155,808 of Wiley, U.S. Pat. No. 3,437,738 of Wagner, U.S. Pat. No. 4,359,619 of Bergoltz, U.S. Pat. No. 4,534,486 of Eidson and U.S. Pat. No. 4,731,511 of Steinhilber et al.

Although the typical wall plate is a single piece, e.g., a unitary molding or stamping, two-piece wall plate designs have been proposed. U.S. Pat. No. 4,833,277 of Jacoby, Jr., et al discloses a wall plate wherein an outer frame portion is attached to the wiring device by screws which remain visible on the outside of the plate, and a second plate is attached to the outer frame, within the opening defined thereby, by snap-fit or other connecting means. U.S. Pat. No. 4,835,343 of Graef et al discloses a two-piece wall plate wherein an inner plate is attached by screws to the wiring device yoke, and an outer plate is attached by snap-fit connectors on its lower surface to the inner plate, which has openings for receiving the connectors. There are no visible mounting or fastening means, and the inner plate is entirely covered by the outer plate upon complete installation. Also, the snap connection means are in the form of ears or tabs extending integrally from the rear side of the cover plate for insertion through slots in the base plate. The ears are thus subject to cracking or breaking.

It is a principal object of the present invention to provide a two-piece wall plate of novel and improved design for use with a wall-mounted electrical device, wherein portions of both pieces are visible in the fully installed condition, thus providing a hitherto unavailable range of decorating options.

Another object is to provide a wall plate for a wall-mounted electrical device wherein an outer or cover plate is attached by snap-fit connecting means to portions of an inner or base plate which extend through an opening in the cover plate.

A further object is to provide a two-piece wall plate for an electrical device wherein the configuration and manner of interconnection of a base plate and a cover plate ensure that the outer periphery of the cover plate, which encompasses the outside boundary of the base plate, firmly contacts the wall surface surrounding the device.

Still another object is to provide a two-piece wall plate for an electrical wiring device having improved means for snap-fit connection of the two pieces, reducing the possibility of cracking or breaking thereof.

Other objects will in part be obvious and will in part appear hereinafter.

SUMMARY OF THE INVENTION

In accordance with the foregoing objects, the invention contemplates a wall plate construction comprising two cooperating pieces, termed a base plate and a cover plate. The wiring device is of conventional design, which includes a mounting strap or yoke having opposite end portions each including at least two openings, one for passage of a screw which is received in a threaded opening of an also conventional wall box, and the other for receiving a screw for attachment of a wall plate.

The base plate of the present invention likewise has at least two openings in both upper and lower portions of its frame. One of the openings of each set is for passage of a screw which is threaded into an aligned opening in the yoke, thereby securely fastening the base plate to the wall-box mounted electrical device. The other opening of each set is aligned with the head of the screw by which the device is mounted to the wall box, thereby providing access to such screws to permit adjustment of the wiring device without removing the base plate. The base plate is rectangular in outline and includes a central rectangular opening surrounded by a bezel portion extending outwardly from the outer or front face of the plate, and having a top and inside and outside side surfaces, the inside side surface defining the opening closely surrounding the wiring device.

The cover plate also has a rectangular outline and a central, rectangular opening of substantially the same dimensions as the outside side surface of the bezel. A lip extends outwardly from the inner or rear face of the cover plate and has an inner boundary of only slightly larger dimensions than the outer periphery of the base plate. One or more elongated ridges extend inwardly from each side of the rectangular opening in the cover plate, and an elongated slot or groove extends along each outside side surface of the bezel. The cover and base plates are of rigid, but somewhat resilient material, such as a high molecular weight plastic. Thus, with the base plate attached to the wiring device, the cover plate may be placed over the base plate and releasably attached thereto by snap fit of the ridges into the grooves on the bezel which extends through the central opening in the cover plate.

In the fully installed condition, the lip on the cover plate surrounds the outer boundary of the base plate and contacts the wall surface around the wiring device; the top surface of the bezel lies in substantially the same plane as the immediately surrounding border of the opening in the cover plate and the visible face of the wiring device. Esthetically pleasing and decorative effects are achieved by coordinating the colors of visible portions of the base and cover plates, and the wiring device. For example, the cover plate and visible surface of the wiring device may be made in the same color and shade, and the base plate in another color or shade to contrast with the surfaces on each side. The planes of the wall-engaging surface of the lip on the cover plate, the ridges around the inside of the rectangular opening of the cover plate, and the grooves in the bezel surfaces are such that when the ridges are engaged in the grooves, the lip firmly engages the wall surface. That is, when the cover plate is placed over the base plate, with the lip of each plate in contact with the wall surface, the ridges around the opening in the cover plate are in a plane parallel to the wall surface and spaced therefrom by a distance grater than the plane of the grooves in the base plate bezel. Thus, as the ridges are snapped into the grooves, the portion of the cover plate is deflected to some extent, thereby ensuring that the lip on the cover plate is firmly engaged with the wall since the base plate is firmly attached to the fixture.

BRIEF DESCRIPTION OF THE DRAWINGS

FIGS. 4, 5 and 6 are rear, side and front elevational views, respectively, of the inner or base piece of the wall plate;

FIGS. 7 and 8 are enlarged, elevational views in section on the lines 7—7 and 8—8, respectively, of FIG. 4;

FIGS. 12 and 13 are enlarged, elevational views in section on the lines 12—12 and 13—13, respectively, of FIG. 9;

FIG. 14 is a side elevational view in section on the line 14—14 of FIG. 2 showing all elements in fully assembled relation;

FIG. 16 is a fragmentary, elevational view in section through one side of the two pieces of the wall plate, illustrating certain dimensional relationships thereof prior to releasably attaching the cover plate to the base plate.

DETAILED DESCRIPTION

Figure 1:
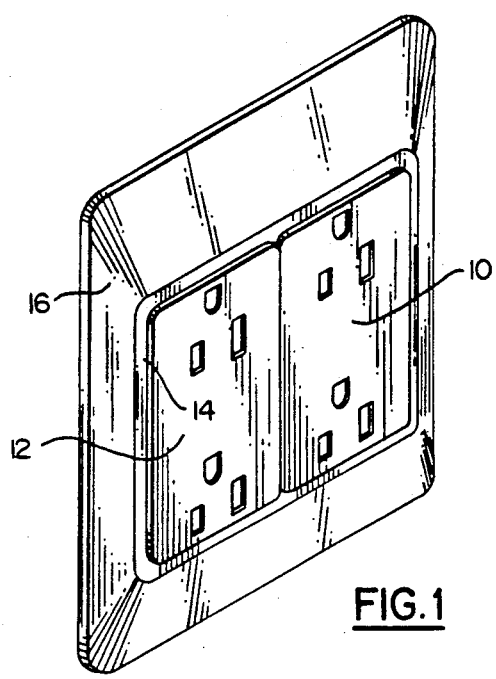
FIG. 1 is a front perspective view of the two-piece wall plate with a pair of duplex receptacles mounted therein.
Figure 2:
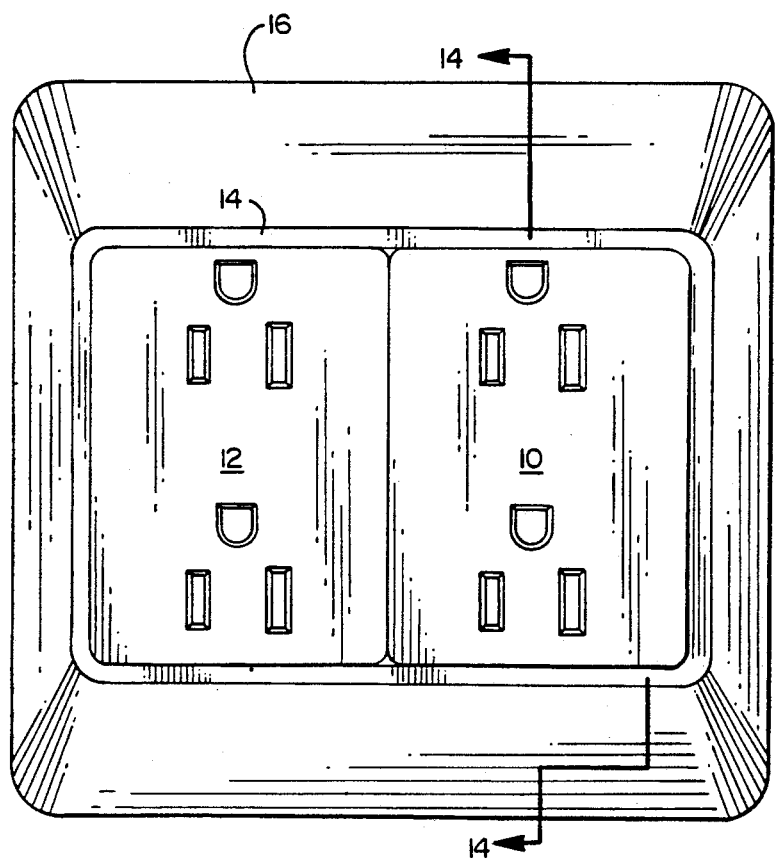
FIG. 2 is a front elevational view of the wall plate and receptacles of FIG. 1.
Figure 3:
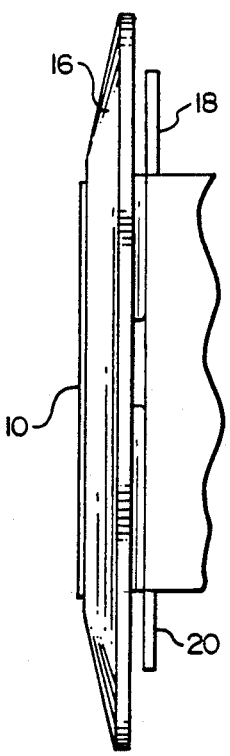
FIG. 3 is a side elevational view thereof.
Figure 9:
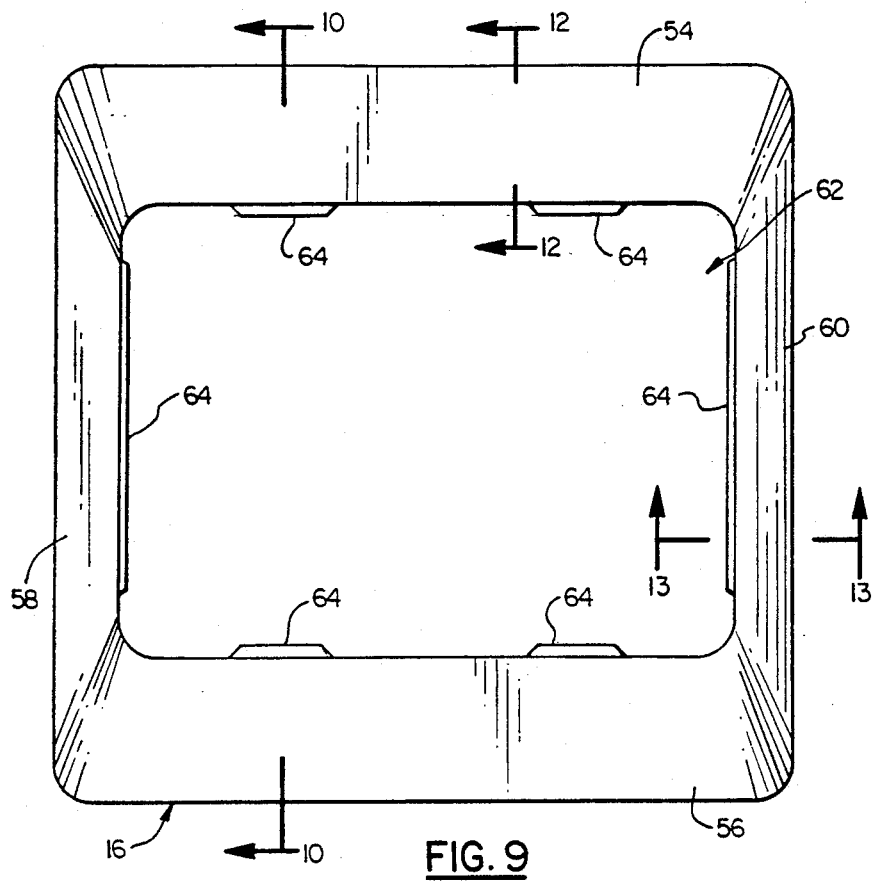
FIG. 9 is a front elevational view of the outer or cover piece of the wall plate.
Figure 10:
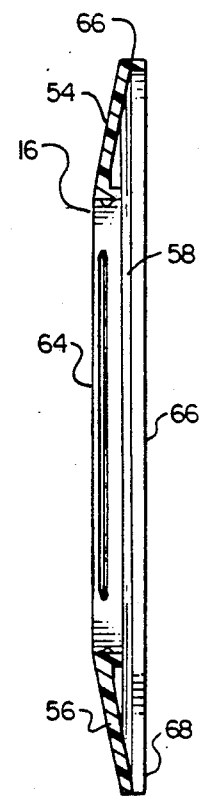
FIG. 10 is a side elevational view in section on the line 10—10 of FIG. 9.
Figure 11:
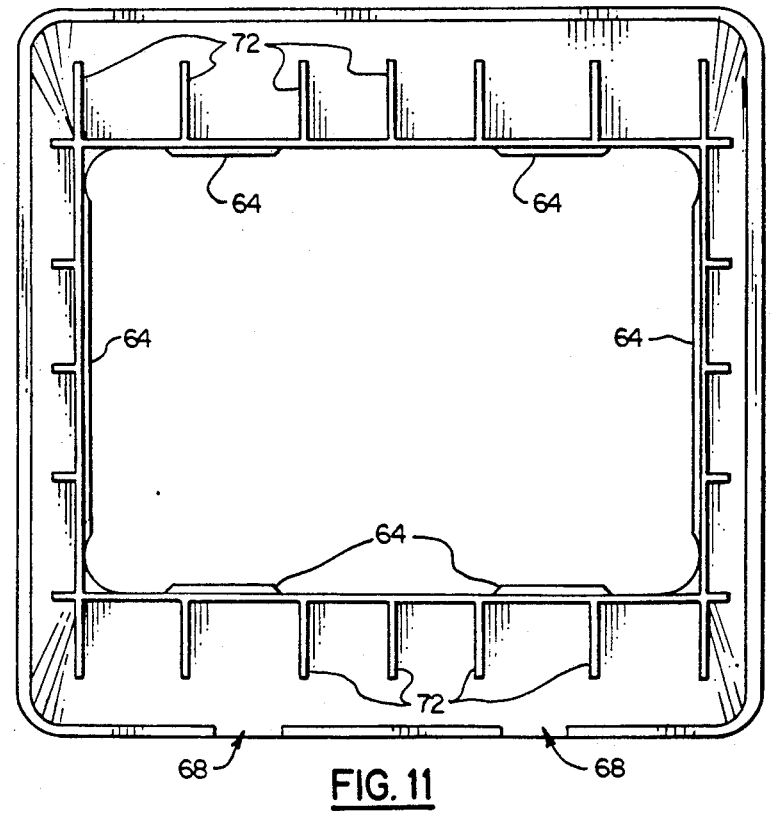
FIG. 11 is a rear elevational view of the outer piece of the wall plate.

Referring now to the drawings, in FIGS. 1-3 the two-piece wall plate of the invention is shown in an embodiment wherein two duplex wall receptacles 10 and 12 are mounted in assembled relation therewith. The wall plate may be constructed for use with only one receptacle, as described in another embodiment later herein, or with more than two such devices. Although shown and described in connection with duplex receptacles for receiving 3-prong plugs, it will be understood that the wall plate may be used with any of a wide variety of wall-mounted wiring devices including, for example, receptacles, switches and infrared presence detectors, all of which include a mounting strap or yoke for mounting the device in a standard wall box.

Receptacles 10 and 12 have exposed surfaces having a combined peripheral outline closely surrounded by bezel 14 of an inner or base plate of the two-piece wall plate. Bezel 14 is also of predetermined, in this case substantially rectangular, outline closely surrounded by the inner periphery of an outer or cover plate 16. Receptacles 10 and 12, or any other wiring device used with the wall plate of the invention, include a mounting strap having mounting ears in the form of end portions 18 and 20 extending outwardly from opposite sides of the device, as seen in FIG. 3. As will later become apparent, the wiring device is mounted in a standard wall box by screws passing through a first opening in each of end portions 18 and 20, the base plate is secured to the device by screws passing therethrough and received in a second opening in each end portion, and cover plate 16 is releasably secured to the base plate by snap-fit means cooperatively positioned on the base and cover plates.

The base plate, denoted generally by reference numeral 22, is shown individually and in more detail in FIGS. 4-8, to which reference is now made. Base plate 22 is preferably formed as a one-piece, plastic molding, in the nature of a relatively flat, open frame having first, top and bottom frame portions 24 and 26, respectively, and side frame portions 28 and 30. First frame portions 24, 26, 28 and 30 collectively define outer and inner faces, seen in FIGS. 4 and 6, respectively, and inside and outside boundaries of base plate 22. Bezel 14 extends outwardly from the outer face of base plate 22 around the inside boundary thereof, having a planar top surface 32 and inwardly and outwardly facing side surfaces 34 and 36, respectively. Inwardly facing side surfaces 34 define first opening 38 which closely surrounds the wiring devices with which the wall plate is used, as seen in FIGS. 1-3.

Elongated grooves 40 extend into each of outwardly facing side surfaces 36 along a substantial portion of their length. Lip 42 extends outwardly from the inner face of base plate 22 about the outside boundary thereof, for contact with the surface of the wall in which receptacles 10 and 12 are mounted surrounding the opening formed for such purpose in the wall. Tabs 44 extend from the outside boundary of frame portion of base plate 22. In addition to first opening 38, base plate 22 includes two pairs of second openings 46 and 48, and two pairs of third openings 50 and 52, in top and bottom frame portions 24 and 26, respectively, the purpose of which will be explained later.

Turning now to FIGS. 9-13, cover plate 16 will be explained in more detail. As with base plate 22, cover plate 16 is a frame-like member having second, top and bottom frame portions 54 and 56, respectively, and side frame portions 58 and 60, preferably formed as a unitary, plastic molding. Second frame portions 54, 56, 58 and 60 collectively define outer and inner faces of the base plate, seen in FIGS. 9 and 11, respectively, and substantially rectangular outside and inside boundaries, the latter defining fourth opening 62 of the wall plate.

Ridges 64 extend inwardly from the inside boundary defined by the second frame portions. Lip 66 extends outwardly from the inner face of cover plate 16 about the entire outside boundary thereof, except for interruptions 68 which mate with tabs 44 in the assembled condition of the two plates, as explained later. Rectangular flange 70 extends from the inner face of the cover plate about the inside boundary thereof. Integral ribs, some of which are denoted by reference numeral 72, extend from the outer surface of flange 70, perpendicular to each side thereof to merge with the inner face of cover plate 16.

Figure 15:
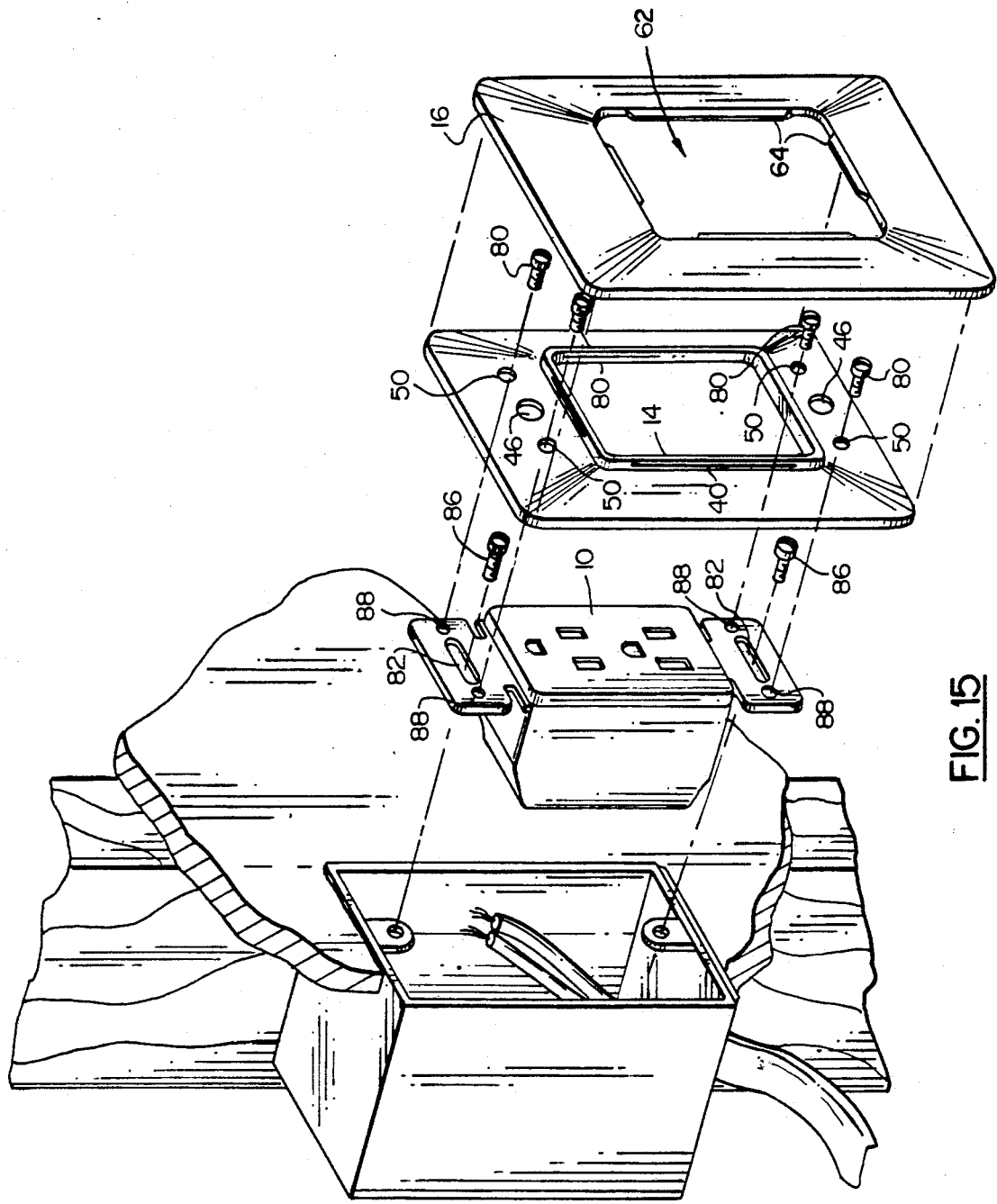
FIG. 15 is an exploded perspective view of an electrical junction box, receptacle and the two-piece wall plates of the invention in a single wiring device embodiment.

The manner of installation of the wall plate in conjunction with the receptacle(s) or other wiring device(s) may be more readily understood from a consideration of the sectional view of FIG. 14, and the exploded perspective view of FIG. 15, the latter showing an embodiment for use with a single wiring device. The same reference numerals are used in FIG. 15 to denote elements shown in previous Figures, the only difference between the embodiments of FIGS. 1-14 and that of FIG. 15 being the size of the inside and outside boundaries of the base and cover plates and, of course, the fact that only one pair of each of the second and third openings are required in the FIG. 15 embodiment, wherein third openings 50 are shown above second openings 46, rather than side-by-side, as in FIGS. 4 and 6. The location of the second and third openings in the base plate will, of course, be dictated by the location of the openings in the mounting strap of the wiring device with which the wall plate is used.

Conventional, metal wall box 74 is secured in the usual manner to a stud 75 or other fixed portion of the structure behind wall 76 in which an opening of appropriate size has been formed for the purpose of mounting one or more wiring devices. Receptacle 10 is mounted in wall box 74 by means of screws 80 which pass through openings 82 in mounting ears 18 and 20 and are threaded into tapped openings 84 in outwardly extending tabs on opposite sides of the wall box. Base plate 22 is then installed, being secured to receptacle 10 by means of screws 86 which extend through the pair of third openings 50 and are received in threaded openings 88 in mounting ears 18 and 20. When so secured, lip 42 will be in contact with the surface of wall 76 surrounding opening 78, and the exposed surface(s) of receptacle(s) 10 (and 12) will be closely surrounded by bezel 14.

Cover plate 16 is then placed in covering relation to base plate 22 with bezel 14 extending through opening 62. The base and cover plates are so dimensioned that when cover plate 16 is placed in such covering relation with lip 66 in contact with wall 76, in surrounding relation to lip 42 of base plate 22, ridges 64 will be in a plane spaced a small distance, indicated by letter D in FIG. 16, from the plane of grooves 40. The material and dimensions of cover plate 14 are such that the plate may be deformed to some degree about the periphery of opening 62. Manual pressure is applied in this area, as indicated by arrow 90 in FIG. 16, which is a cross section through side frame portions 28 and 58 of the base plate and cover plate respectively, after cover plate 16 is placed in covering relation to base plate 22, but before the cover plate has been deformed. FIG. 16 is somewhat exaggerated for clearer illustration of this feature, dimension D being on the order, for example, of about 0.010".

Inward deformation of cover plate 16 about the periphery of opening 62 will cause ridges 64 to engage with a snap fit in recesses 40 around the periphery of bezel 14, thus releasably securing cover plate 16 to base plate 22, as shown in FIG. 14. In the event that it becomes necessary to remove cover plate 16, the snap fit connection may be released by inserting the blade of a screwdriver into the small space, indicated in FIG. 14 by arrow 92, in the interruption(s) 68 in lip 66, above tab(s) 44, and prying the cover plate outwardly. It will be noted that with cover plate 22 removed, the heads of screws 80 are accessible to a screwdriver extended through openings 46 (and 48). This permits adjustment of the wiring device inwardly or outwardly with respect to wall box 74, without removing base plate 22.

From the foregoing, it may be seen that the wall plate of the invention provides an attractive, as well as functional, accessory for wall mounted wiring devices. No fastening elements such as screw heads, or the like, are visible when the wiring device and wall plate are fully installed although the base plate which fully covers the wall box, is firmly attached by screws to the electrical fixture, an improvement over wall plates which are entirely snap-connected. The wiring device mounting screws are accessible for adjustment purposes simply by removing a snap-connected part. The cover plate portion has a smooth, uninterrupted, attractively formed outer face, and the upper surface of a bezel portion of the base plate is also visible, closely surrounding and providing a frame-like effect for the exposed surface of the wiring device. Enhanced decorating possibilities are thus provided as, for example, by making the base and cover plates of different but esthetically compatible colors or shades. Since the bodies of wiring devices, including the exposed surface, are also commonly formed as plastic moldings, the option is also present to make the wall plate pieces in colors which complement that of the wiring device, e.g., the cover plate and wiring device body may be the same color and the base plate a different color or shade. The option is also present, of course, to provide metal plating on one or both of the base and cover plates.

What is claimed is:

1. A two-piece wall plate for installation with at least one electrical wiring device having a body portion with an outer face of predetermined peripheral outline and a mounting strap with end portions extending outwardly in opposite directions from said body portion, each of said end portions having at least two openings therethrough, one for passage of a first screw securing said wiring device to a junction box and the other for receiving a screw attaching a portion of said wall plate to said wiring device, said wall plate comprising:

a) a base plate comprising:

i) integrally formed top, bottom and side first frame portions collectively defining inner and outer faces and inside and outside boundaries of said base plate;

ii) a bezel extending outwardly from said base plate outer face about substantially the entire periphery of said base plate inside boundary, and having a top surface and inwardly and outwardly facing side surfaces, said inwardly facing side surface defining a first opening of substantially the same configuration and dimensions as said predetermined outline;

iii) a second and a third opening in each of said top and bottom frame portions;

b) a cover plate comprising:

i) integrally formed top, bottom and side second frame portions collectively defining inner and outer faces and inside and outside boundaries of said cover plate;

ii) a first lip portion extending outwardly from said cover plate inner face about substantially the entire periphery of said cover plate outside boundary, said first lip portion having an inner boundary encompassing said base plate outer boundary;

iii) said inside boundary of said second frame portion defining a fourth opening of substantially the same configuration and dimensions as said outwardly facing wall of said bezel; and c) cooperative, first and second engagement means on said bezel outwardly facing side surface and said second frame portion inside boundary, respectively, for releasably retaining said base and cover plates in mutually engaged relation with said bezel extending through said fourth opening.

2. The wall plate of claim 1 wherein said base plate and said cover plate are each an integrally-formed plastic molding.

3. The wall plate of claim 2 wherein said first and fourth openings are both substantially rectangular in outline.

4. The wall plate of claim 3 wherein said first engagement means comprises an elongated slot in said bezel outwardly facing surface, and said second engagement means comprises an elongated ridge on said second frame inside boundary for releasable engagement in said slot.

5. The wall plate of claim 1 and further including a second lip portion extending outwardly from said base plate inner face about substantially the entire periphery of said base plate outside boundary, said second lip portion having an outer boundary in close proximity to said first lip portion inner boundary when said base and cover plates are in said mutually engaged relation.

6. The wall plate of claim 5 wherein said bezel outwardly facing side surface and said fourth opening are both rectangular in outline, and said first and second engagement means comprise an elongated slot in one and an elongated ridge on the other of said bezel outwardly facing side surface and said inside boundary of said second frame portion.

7. A wall plate assembly for attachment to a wiring device installed in the open front of a junction box mounted behind an opening in a building wall, said wiring device including a body portion and a mounting strap and being secured to said junction box by a first pair of mounting screws passing loosely through respective openings in said mounting strap, said assembly comprising:

a) a base plate comprising a first, frame-like member having an outer periphery larger than the outer periphery of said wall opening and an inner periphery adapted to closely surround an exposed surface of said wiring device, said base plate and wiring device cooperatively entirely covering said open front of said wall box when assembled therein, b) a cover plate comprising a second, frame-like member having an outer periphery larger than the outer periphery of said base plate, and an inner periphery closely surrounding an exposed surface of said base plate;

c) cooperative snap-fit connection means including a first portion on said base plate and a second portion on said cover plate for releasable connection of said cover plate to said base plate; and d) screw means for securing said base plate to said mounting strap, said screw means being concealed by said cover plate when the latter is connected to said base plate.

8. The wall plate assembly of claim 7 wherein said snap-fit connection means comprises an elongated slot in one and an elongated ridge on the other of said base and cover plates.

9. The wall plate assembly of claim 8 wherein one of said slot and said ridge is formed at said cover plate inner periphery, and the other of said slot and said ridge is formed adjacent the outer periphery of said base plate exposed surface.

10. The wall plate assembly of claim 9 wherein said base plate includes a bezel portion surrounding and defining said base plate inner periphery, said bezel portion having a forward surface forming said base plate exposed surface, and side surfaces closely surrounded by said cover plate inner periphery.

11. The wall plate assembly of claim 10 wherein said slot is formed in one or more of said side surfaces of said bezel portion and said ridge extends inwardly about at least a portion of said cover plate inner periphery.

* * * * *